(No Model.) 2 Sheets—Sheet 1.

H. & J. W. HAWKINS & J. B. HARMON.
LUMBER CARRIER.

No. 500,127. Patented June 27, 1893.

Witnesses
H. Alber
R. A. McAlevy

Inventors
Harry Hawkins
John W. Hawkins
John B. Harmon
By their Attorney P. Byrne (No Model.) 2 Sheets—Sheet 2.
H. & J. W. HAWKINS & J. B. HARMON.
LUMBER CARRIER.
No. 500,127. Patented June 27, 1893.
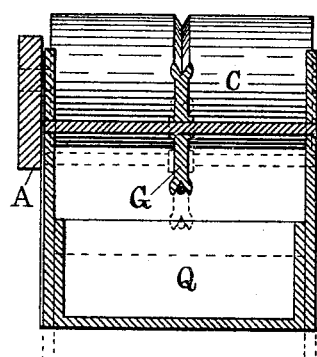
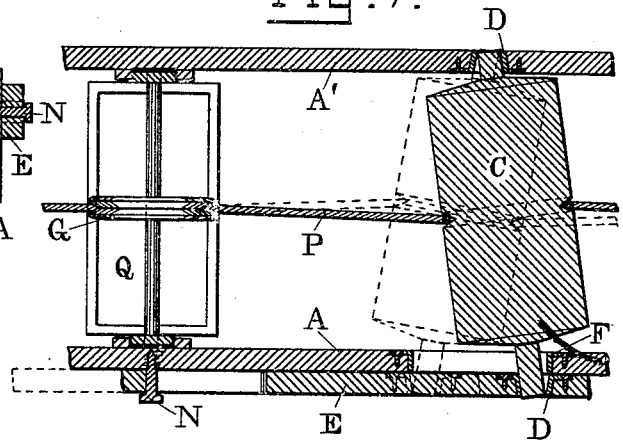
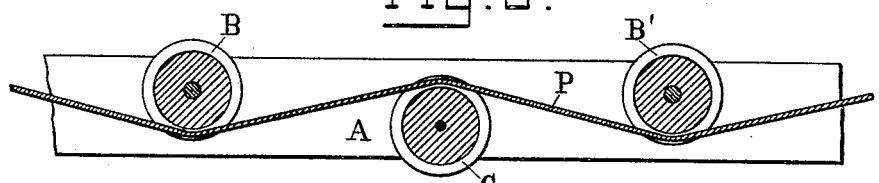
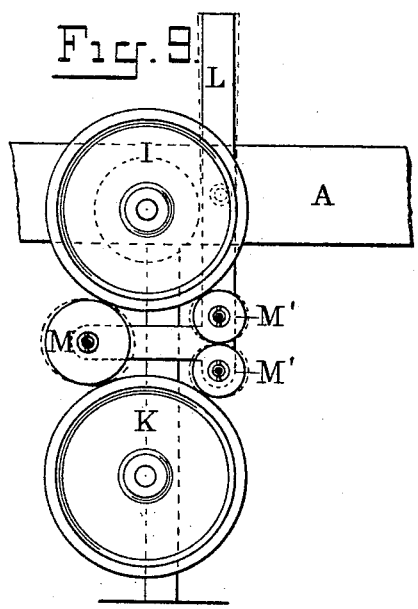
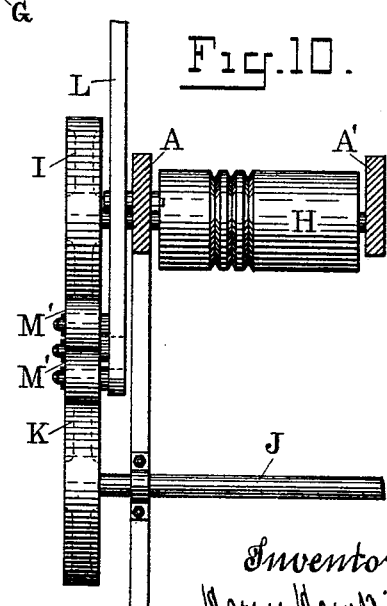

UNITED STATES PATENT OFFICE.

HARRY HAWKINS, JOHN WIX HAWKINS, AND JOHN B. HARMON, OF BIRMINGHAM, ALABAMA.

LUMBER-CARRIER.

SPECIFICATION forming part of Letters Patent No. 500,127, dated June 27, 1893.

Application filed February 24, 1893. Serial No. 463,654. (No model.)

*To all whom it may concern:*

Be it known that we, HARRY HAWKINS, JOHN WIX HAWKINS, and JOHN BLAKE HARMON, citizens of the United States, residing at Birmingham, in the county of Jefferson and State of Alabama, have invented certain new and useful Improvements in Lumber-Carriers; and we do hereby declare the following to be a full, clear, and exact description of the invention, such as will enable others skilled in the art to which it appertains to make and use the same.

Our invention relates to improvements in that class of devices, known as lumber carriers, by which the lumber is carried continuously in saw mills, as it falls from the saw; and the objects of our improvements are, first, to construct a device of that kind, that will be simple in all its parts, a device that can be cheaply manufactured and put in operation, at the saw mill or other place of use; second, to construct a lumber carrier, that the rolls are kept in motion by a simple arrangement of wire, or other description of flexible rope, or if desired the rolls can be driven by sprocket wheels and chain belt, without changing the general construction; the rolls are driven by friction wheels arranged in such a manner, that they can be driven in either direction, without changing the direction of the driving shaft; third, to provide one or more sets of rolls, at such places as may be desired in the carrier, that will angle in either direction, by the movement of a lever controlled by the operator. The placing of the said rolls at an angle, will throw the lumber off the carrier at either side as may be desired, at such places as the angle rolls are located. Any number of sets of angle rolls can be placed in the carrier, and operated by the same lever, or separate levers as may be desired. We attain these objects by the novel construction and arrangement of the mechanism illustrated in the accompanying drawings, in which—

Figure 1:
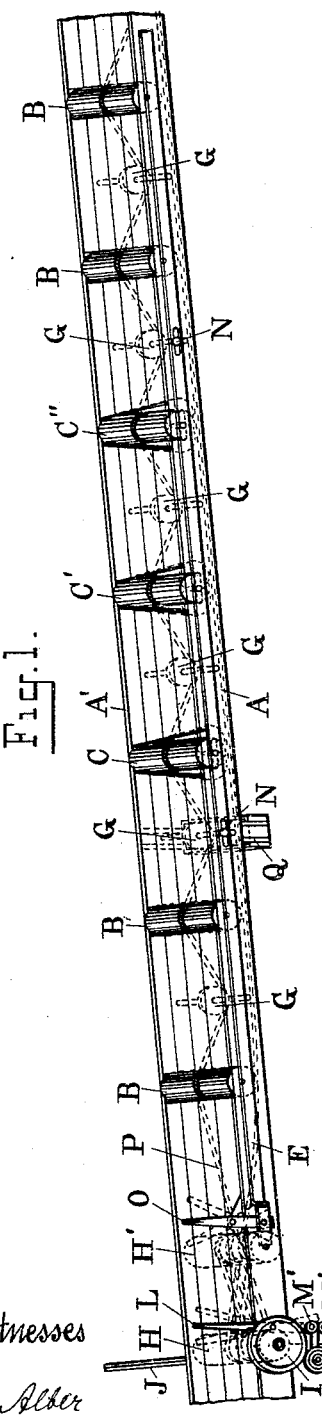
Figure 2:
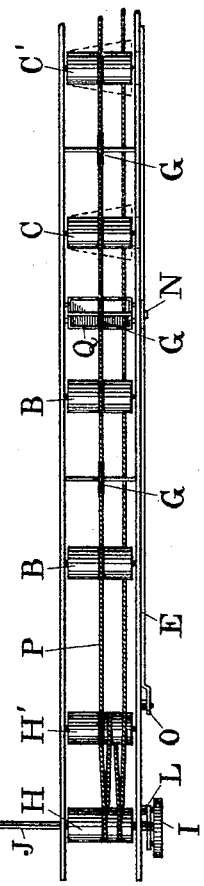
Figure 3:
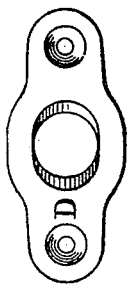
Figure 4:
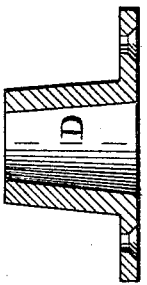
Figure 5:
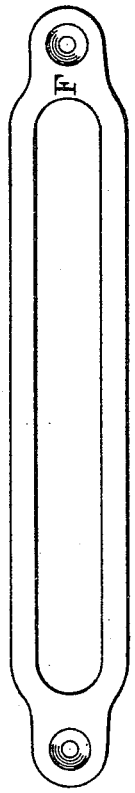

Figure 1, is a perspective side and top view, of our lumber carrier, part being broken off at both ends. Fig. 2, is a top view of part of the same, the floor between the rolls left off. Fig. 3, is an enlarged front view of one of the angle roller bearings. Fig. 4, is a sectional view of the same, through the center. Fig. 5, is an enlarged front view of one of the oblong bearings, for the shaft at the movable end of the angle roll to slide in. Fig. 6 is an enlarged cross sectional view of the frame and weight box, through the center of the weight box. Fig. 7, is an enlarged horizontal sectional view of part of the frame, through the center of one of the angle rollers and roller bearings. Fig. 8, is an enlarged sectional view through the center of two of the rollers and one of the idler sheaves, showing the rope in position, when placed over the idler sheave and under the rollers. Fig. 9, is an enlarged front view of the friction wheels and part of the hand lever to operate the same. Fig. 10, is a side view of the same, in connection with a cross section of the frame.

Similar letters refer to similar parts throughout the several views.

The sides of the carrier frame A. A' are made of suitable lumber, provided with cross framing as may be desired, and covered with a floor between the rolls. The frame is generally secured on a suitable trestle work not necessary to be shown. The sides A. A' are provided at suitable intervals with bearings for a series of stationary rolls B to work in. The rollers B. B' are made of hard wood secured on iron shafts, and have a V groove formed in them, for a rope to operate in, as shown. The angle rolls C. C' C'' are made of the same material and in the same manner, as described for rollers B. B'. They are provided at their stationary ends, with bearings D. Fig. 3, made of cast metal, the opening for the shaft on the inside being formed oval as shown, to permit a sufficient amount of play for the rolls to angle. On the opposite end of the rolls like bearings, are placed in the shifting, or connecting rod E. On the inside of the shifting rod, in the side A, are placed at the movable end of the angle rolls, the oblong bearings F. Fig. 5, made of cast metal, of sufficient length to permit the shaft to slide in them, the distance desired to angle the rolls. In suitable bearings are placed between each roll a series of idler sheaves G. They are made of hard wood, or any metallic substance, and have a V groove formed in them for rope, and are secured on iron shafts journaled in the side frames A. A'. Near the end of the frame most convenient to a line shaft, secured in suitable bearings, are placed two driving rolls H. H', having a series of V grooves formed in them. On the outer end of the driving roll H, secured on the shaft, is placed a friction wheel I made of cast metal, and on the counter, or line shaft J, is placed a like friction wheel K made of cast metal. On the hand lever L pivoted to the side frame A, secured and journaled on an arm at its lower end, are three small friction wheels M. M' made of paper, or other yielding substance, the said wheels when the lever stands vertical, remaining out of contact with the large friction wheels. When the hand lever is moved to the left as indicated by dotted line, it brings the intermediate friction wheel M journaled on the arm of the hand lever, in contact with the friction wheels I and K, the driver K communicating a rotary motion through the intermediate M to the wheel I and driving roller H. If the lever is moved to the right, it will bring the upper connecting friction wheel M' in contact with the friction wheel I, and the lower connecting wheel M' in contact with the driver K at the same time, communicating a rotary motion through the wheels M' M', to the friction wheel I and driving roller H, in an opposite direction to the movement of the driver K. Secured on the outside of the side frame A, is placed the shifting rod E. It is provided with slots at suitable intervals, and secured to the frame by bolts N, the said bolts allowing sufficient freedom under the head for the rod to slide freely. The said shifting rod is provided at its end, with a hand lever O pivoted to the side frame, and connected to the end of shifting rod by a pin, the bearing of one end of the angle rolls being placed in the shifting rod. The moving of the hand lever as indicated by the dotted lines, will slide the end of the angle rolls to the right, or the left. On the driving rolls H. H' in the grooves, is placed the driving rope P, which may be of wire, hemp, manila, or any flexible rope. It is wound two or more turns round the driving rolls alternately. The rope is then passed over each carrier roll, and under each idler sheave, to the end of the carrier. Then both ends of the rope are brought together underneath the rolls and spliced, to make an endless rope. The placing of the rope may be reversed, by placing it under the rolls and over the idlers, if so desired. To take up the slack, and keep the rope at all times of a sufficient tension to drive the rolls, one or more of the idler shafts, are journaled in uprights secured to the ends of a weight box Q. The said uprights slide in grooves, formed by nailing two cleats on the inside of the side frames. The uprights, or vertical standards secured at their bottom ends to the weight box Q, and connected near their upper ends by the shaft of the idler sheave G journaled in them, form a connected frame and weight, suspended on the driving rope by the sheave G, to keep the rope at sufficient tension to drive the rollers.

Having thus described our invention, what we claim as new, and desire to secure by Letters Patent, is—

1. In a lumber carrier consisting of a series of carrier rollers journaled in side frames and having V grooves formed in the rollers for rope, a series of idler sheaves provided with V grooves secured on shafts journaled in the side frames between the rollers, two driving rollers journaled in the side frames having a series of V rope grooves, a friction wheel secured on the end of one driving roller shaft, a like friction wheel secured on a driving shaft driven by any suitable power, a hand lever pivoted on one of the side frames having journaled near its lower end, two intermediate friction wheels, an arm projecting at a right angle near the lower end of the lever, having journaled near its end a connecting friction wheel, an endless driving rope with two, or more turns in the V grooves of the driving rollers, one side of the rope passing under the series of idler sheaves, and over the series of rollers journaled in the side frames, all combined as shown and for the purpose described.

2. In a lumber carrier, a series of carrier rolls journaled in side frames, a series of idler sheaves secured on shafts journaled in the side frames, one or more sets of angle rollers, consisting of two or more rolls to the set, one end of the said rolls journaled in one of the side frames the opposite end of the rolls journaled in a shifting rod, having a lever pivoted at its end, the movements of the lever shifting the rod in both directions, throwing the ends of the angle rolls to the right, or the left, and means to drive the carrier and angle rolls, substantially as described.

3. In a lumber carrier, a series of carrier rolls journaled in side frames, a series of idler sheaves secured on shafts journaled in the side frames, one or more sets of angle rolls, one end of the said rolls journaled in metal bearings secured in one of the side frames, the said bearings formed oval on the inside to allow the rolls to angle, the opposite ends of the angle rolls journaled in like bearings secured in a shifting rod, placed on the outside of the frame; an oblong metal bearing placed in the side frame, on the inside of the shifting rod, for the roll shaft to slide in, an endless rope placed in grooves formed in the rolls and idler sheaves, one, or more weight boxes attached to idler sheaves suspended on the ropes and means of driving the rope, substantially as described.

In testimony whereof we affix our signatures in presence of two witnesses.

HARRY HAWKINS.
JOHN WIX HAWKINS.
JOHN B. HARMON.

Witnesses:
L. R. EDGE,
BYRON DOZIER.